US012570262B2

(12) United States Patent
Ganzel

(10) Patent No.: US 12,570,262 B2
(45) Date of Patent: Mar. 10, 2026

(54) TANDEM POWER TRANSMISSION UNIT AND BRAKE SYSTEMS USING SAME

(71) Applicant: ZF Active Safety US Inc., Livonia, MI (US)

(72) Inventor: Blaise J. Ganzel, Ann Arbor, MI (US)

(73) Assignee: ZF ACTIVE SAFETY US INC., Livonia, MI (US)

( * ) Notice: Subject to any disclaimer, the term of this patent is extended or adjusted under 35 U.S.C. 154(b) by 947 days.

(21) Appl. No.: 17/708,070

(22) Filed: Mar. 30, 2022

(65) Prior Publication Data

US 2023/0311836 A1 Oct. 5, 2023

(51) Int. Cl.
*B60T 13/74* (2006.01)
*B60T 13/14* (2006.01)
(Continued)

(52) U.S. Cl.
CPC .......... *B60T 13/745* (2013.01); *B60T 13/148* (2013.01); *B60T 13/686* (2013.01); *F15B 1/26* (2013.01);
(Continued)

(58) Field of Classification Search
CPC .... B60T 13/745; B60T 13/148; B60T 13/686; B60T 13/746; B60T 13/12; B60T 7/042; B60T 8/4081; B60T 8/4077; B60T 2270/203; B60T 2240/402; B60T 2270/403; F16B 1/26; F16B 13/02; F16B 15/18
See application file for complete search history.

(56) References Cited

U.S. PATENT DOCUMENTS 6,767,305 B2 * 7/2004 Backes ................... F16D 65/18
188/161
9,227,611 B2 * 1/2016 Gilles ................... B60T 8/3275
(Continued)

FOREIGN PATENT DOCUMENTS

DE 69931984 T2 2/2007
DE 112014001001 T5 11/2015
DE 102022206557 A1 6/2022

OTHER PUBLICATIONS

German Search Report for corresponding German Application Serial No. 10 2023 202 535.3, dated Mar. 14, 2024, pp. 1-10.

*Primary Examiner* — Thomas W Irvin
(74) *Attorney, Agent, or Firm* — Tarolli, Sundheim, Covell & Tummino LLP

(57) ABSTRACT

A tandem power transmission unit includes a ball screw and a ball nut selectively driven by the ball screw for longitudinal motion relative thereto. A primary piston is operatively coupled to the ball nut. A secondary piston is operatively coupled to the primary piston. A primary chamber is configured to contain hydraulic fluid and is selectively pressurized by reciprocal motion of the primary piston. A secondary chamber is configured to contain hydraulic fluid and is selectively pressurized by reciprocal motion of the secondary piston driven indirectly by longitudinal motion of the ball nut. A first output channel selectively places the primary chamber in fluid communication with at least one component of a brake system for provision of pressurized hydraulic fluid thereto. A second output channel selectively places the secondary chamber in fluid communication with at least one component of a brake system for provision of pressurized hydraulic fluid thereto.

29 Claims, 11 Drawing Sheets

(51) Int. Cl.
B60T 13/68 (2006.01)
F15B 1/26 (2006.01)
F15B 13/02 (2006.01)
F15B 15/18 (2006.01)

(52) U.S. Cl.
CPC .............. F15B 13/02 (2013.01); F15B 15/18 (2013.01); B60T 2270/203 (2013.01); B60T 2270/402 (2013.01); B60T 2270/403 (2013.01)

(56) References Cited

U.S. PATENT DOCUMENTS

| | | | | |
|---|---|---|---|---|
| 9,278,679 | B2 | 3/2016 | Leiber et al. | |
| 9,545,905 | B2 * | 1/2017 | Ohnishi | B60T 13/745 |
| 9,827,960 | B2 | 11/2017 | Feigel et al. | |
| 10,259,440 | B2 * | 4/2019 | Gilles | B60T 8/4077 |
| 10,981,428 | B2 * | 4/2021 | Rosenfeld | F16H 25/2204 |
| 11,221,062 | B2 * | 1/2022 | Leiber | F16H 25/20 |
| 11,904,820 | B2 * | 2/2024 | Ganzel | B60T 7/042 |
| 11,951,956 | B2 * | 4/2024 | Ganzel | B60T 8/4863 |
| 2011/0138802 | A1 * | 6/2011 | Sakuma | B60T 7/042 |
| | | | | 60/545 |
| 2014/0197680 | A1 * | 7/2014 | Gilles | B60T 8/4845 |
| | | | | 303/2 |
| 2016/0016569 | A1 * | 1/2016 | Odaira | B60T 8/4077 |
| | | | | 303/15 |
| 2016/0272178 | A1 * | 9/2016 | Feigel | B60T 8/4081 |
| 2019/0100189 | A1 * | 4/2019 | Ganzel | B60T 7/042 |
| 2021/0108709 | A1 * | 4/2021 | Leiber | F16D 65/16 |
| 2023/0012180 | A1 | 1/2023 | Ahn et al. | |
| 2024/0067151 | A1 * | 2/2024 | Ganzel | B60T 13/686 |
| 2024/0359674 | A1 * | 10/2024 | Ganzel | B60T 8/92 |
| 2025/0050853 | A1 * | 2/2025 | Ganzel | B60T 8/4081 |
| 2025/0050854 | A1 * | 2/2025 | Ganzel | B60T 13/146 |
| 2025/0074374 | A1 * | 3/2025 | Ganzel | B60T 17/22 |
| 2025/0074375 | A1 * | 3/2025 | Ganzel | B60T 8/4081 |

* cited by examiner

TANDEM POWER TRANSMISSION UNIT AND BRAKE SYSTEMS USING SAME

TECHNICAL FIELD

This disclosure relates to an apparatus and method for use of a power transmission unit and, more particularly, to methods and apparatus of a tandem power transmission unit and brake systems using same.

BACKGROUND

A brake system may include anti-lock control including a hydraulic braking pressure generator, a braking pressure modulator which is provided in the pressure fluid conduits between the braking pressure generator and the wheel brakes and which serves to vary the braking pressure by changing the volume of a chamber containing the hydraulic fluid, sensors for determining the wheel rotational behavior, and electronic circuits for processing the sensor signals and for generating braking-pressure control signals. Brake systems may also include both anti-lock control and traction slip control, which can use braking pressure modulators for controlled vehicular braking.

SUMMARY

In an aspect, a tandem power transmission unit is disclosed. The tandem power transmission unit includes a ball screw and a ball nut selectively driven by the ball screw for longitudinal motion relative thereto. A primary piston is operatively coupled to the ball nut. A secondary piston is operatively coupled to the primary piston. A block housing at least partially encloses the primary piston, the secondary piston, and the ball screw. A primary chamber is at least partially defined by the block housing and a face of the primary piston. The primary chamber is configured to contain hydraulic fluid and is selectively pressurized by reciprocal motion of the primary piston with respect to the block housing driven directly by longitudinal motion of the ball nut. A secondary chamber is at least partially defined by the block housing and a face of the secondary piston. A backside of the secondary piston at least partially defines the primary chamber. The secondary chamber is configured to contain hydraulic fluid and is selectively pressurized by reciprocal motion of the secondary piston with respect to the block housing driven indirectly by longitudinal motion of the ball nut. A first output channel selectively places the primary chamber in fluid communication with at least one component of a brake system for provision of pressurized hydraulic fluid thereto. A second output channel selectively places the secondary chamber in fluid communication with at least one component of a brake system for provision of pressurized hydraulic fluid thereto. An electric motor selectively drives the ball screw to responsively reciprocate at least one of the primary and secondary pistons within a corresponding primary or secondary chamber. A motor housing at least partially encloses the ball nut and the electric motor.

BRIEF DESCRIPTION OF THE DRAWINGS

For a better understanding, reference may be made to the accompanying drawings, in which.

DESCRIPTION OF ASPECTS OF THE DISCLOSURE

Unless defined otherwise, all technical and scientific terms used herein have the same meaning as is commonly understood by one of ordinary skill in the art to which the present disclosure pertains.

The invention comprises, consists of, or consists essentially of the following features, in any combination.

Figure 1:
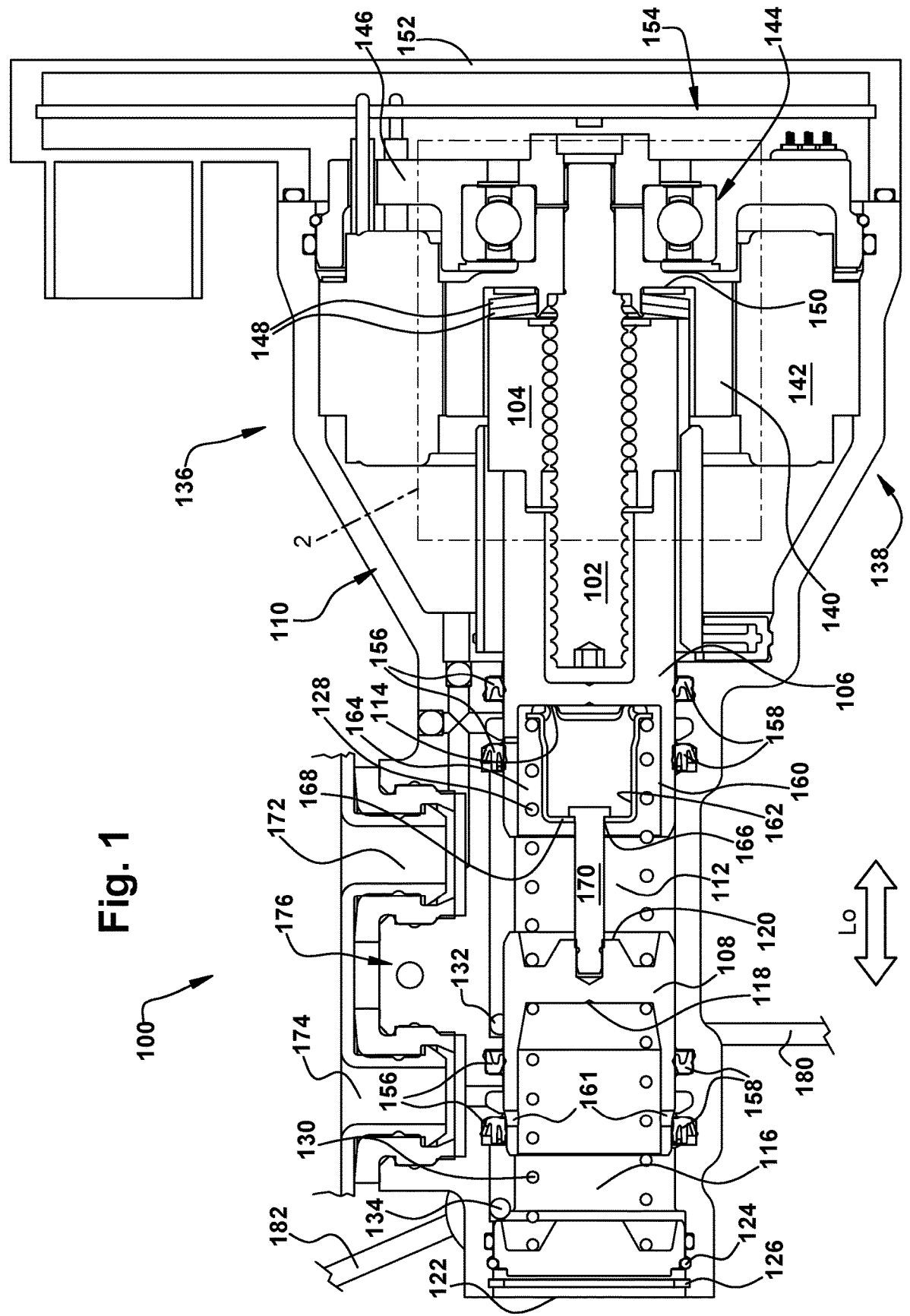
FIG. 1 is a schematic partial cross-sectional view of a tandem power transmission unit according to an aspect of the present invention, in a first configuration.

FIG. 1 depicts a power transmission unit of a tandem-acting plunger type, hereafter referenced for brevity as a tandem power transmission unit or tandem PTU 100. The tandem PTU 100 includes a ball screw 102, a ball nut 104 selectively driven by the ball screw 102 for longitudinal motion relative thereto, and a primary piston 106 operatively coupled to the ball nut 104 (e.g., via a press-fit connection therebetween). The primary piston 106 is indirectly driven by the ball screw 102 via engagement of the primary piston 106 with the ball nut. A secondary piston 108 is operatively coupled to the primary piston 106, though in many use environments, this will be a flexible (non-rigid) connection.

A block housing 110 at least partially encloses the primary piston 106, the secondary piston 108, and the ball screw 102. A primary chamber 112 is at least partially defined by the block housing 110 and a face 114 of the primary piston 106. The primary chamber 112 is configured to contain hydraulic fluid and is selectively pressurized by reciprocal motion of the primary piston 106 with respect to the block housing 110. The primary piston 106 is driven directly by longitudinal motion of the ball nut 104. The term "longitudinal", as used herein, is substantially in the horizontal direction, in the orientation of FIG. 1, and is indicated by arrow "Lo".

A secondary chamber 116 is at least partially defined by the block housing 110 and a face 118 of the secondary piston 108. A backside 120 of the secondary piston 108 at least partially defines the primary chamber 112. The secondary chamber 116 may be at least partially defined by an end cap 122 located on the block housing 110. For example, the end cap 122 may be located at a portion of the block housing 110 which is longitudinally opposite an electric motor used to drive the ball screw 102, as discussed below. The end cap 102 may be retained on the block housing 110 in any desirable manner, such as, but not limited to, via at least two fastening structures (shown schematically here as a wire ring 124 and a rectangular ring 126. Through use of an open-ended housing 110, with an end cap 122 installed after assembly of the tandem PTU 100, machining and assembly of the tandem PTU 100 could be facilitated as desired.

A primary spring 128 may be interposed longitudinally between the primary and secondary pistons 106 and 108. The primary spring 128 selectively resists longitudinally directed compressive force therebetween. A secondary spring 130 may be interposed longitudinally between the secondary piston 108 and an end portion (here, end cap 122) of the block housing 110. The secondary spring 130 selectively resists longitudinally directed compressive force between the secondary piston 108 and the end portion of the block housing 110.

For some use environments of the tandem PTU 100, the primary spring 128 may have a greater resistance to compression than does the secondary spring 130. Accordingly, in these situations, when longitudinally oriented force is exerted upon the primary piston 106, the secondary spring 130 will "give" (begin to compress) earlier and to a greater extent than will the primary spring 128, such that the primary spring 128 transfers force from the primary piston 106 to the secondary piston 108. Example values for the primary spring 128 force in some use environments include, but are not limited to, the range of about 40-100 N, more specifically about 50-80 N, and more specifically about 60 N. Example values for the secondary spring 130 force in some use environments include, but are not limited to, the range of about 10-50 N, more specifically about 20-40 N, and more specifically about 30 N. One of ordinary skill in the art will be readily able to provide primary and secondary springs 128 and 130 having desired characteristics for a particular use environment, such as facilitating substantially simultaneous shutoff of fluid outputs from the primary and secondary chambers 112 and 116.

The secondary chamber 116 is configured to contain hydraulic fluid and is selectively pressurized by reciprocal motion of the secondary piston 108 with respect to the block housing 110 driven indirectly by longitudinal motion of the ball nut 104. That is, longitudinally oriented force toward the left, in the orientation of FIG. 1, is transmitted in a "tandem" manner from the ball screw 102, through the ball nut 104, to the primary piston 106, through the primary spring 128, and to the secondary piston 108. As a result, the primary and secondary pistons 106 and 108 can both be driven by the ball screw 102. The primary and/or secondary springs 128 and 130 will resist this leftwardly oriented force, and tend to urge the primary and/or secondary piston 106 and 108 toward the right, in the orientation of FIG. 1.

A first output channel 132 selectively places the primary chamber 112 in fluid communication with at least one component of a brake system for provision of pressurized hydraulic fluid thereto. A second output channel 134 selectively places the secondary chamber 116 in fluid communication with at least one component of a brake system for provision of pressurized hydraulic fluid thereto. Example brake systems using the tandem PTU 100 will be discussed in detail below, with reference to one or more of FIGS. 3-4 and 7-11. For certain use environments of the tandem PTU 100, the first and second output channels 132 and 134 may be arranged relative to the block housing 110 such that rotation of the ball screw 102 drives the primary and secondary pistons 106 and 108 longitudinally to block fluid flow from the reservoir and thus prevent fluid from traveling into the respective first and second output channels 132 and 134 substantially simultaneously during operation of the tandem PTU 100.

An electric motor 136 is provided for selectively driving the ball screw 102 to responsively reciprocate at least one of the primary and secondary pistons 106 and 108 within a corresponding primary or secondary chamber 112 or 116. A motor housing 138, which may be integrally formed with the block housing 110 or separately provided and attached thereto at least partially encloses the ball nut 104 and the electric motor 136. The electric motor 136 includes a motor rotor 140 operatively coupled to the ball screw 102 and a motor stator 142 mounted on the motor housing 138. Torque developed by the motor stator 142 is resisted by at least a portion of the motor housing 138 to mechanically stabilize the electric motor 136.

Figure 2:
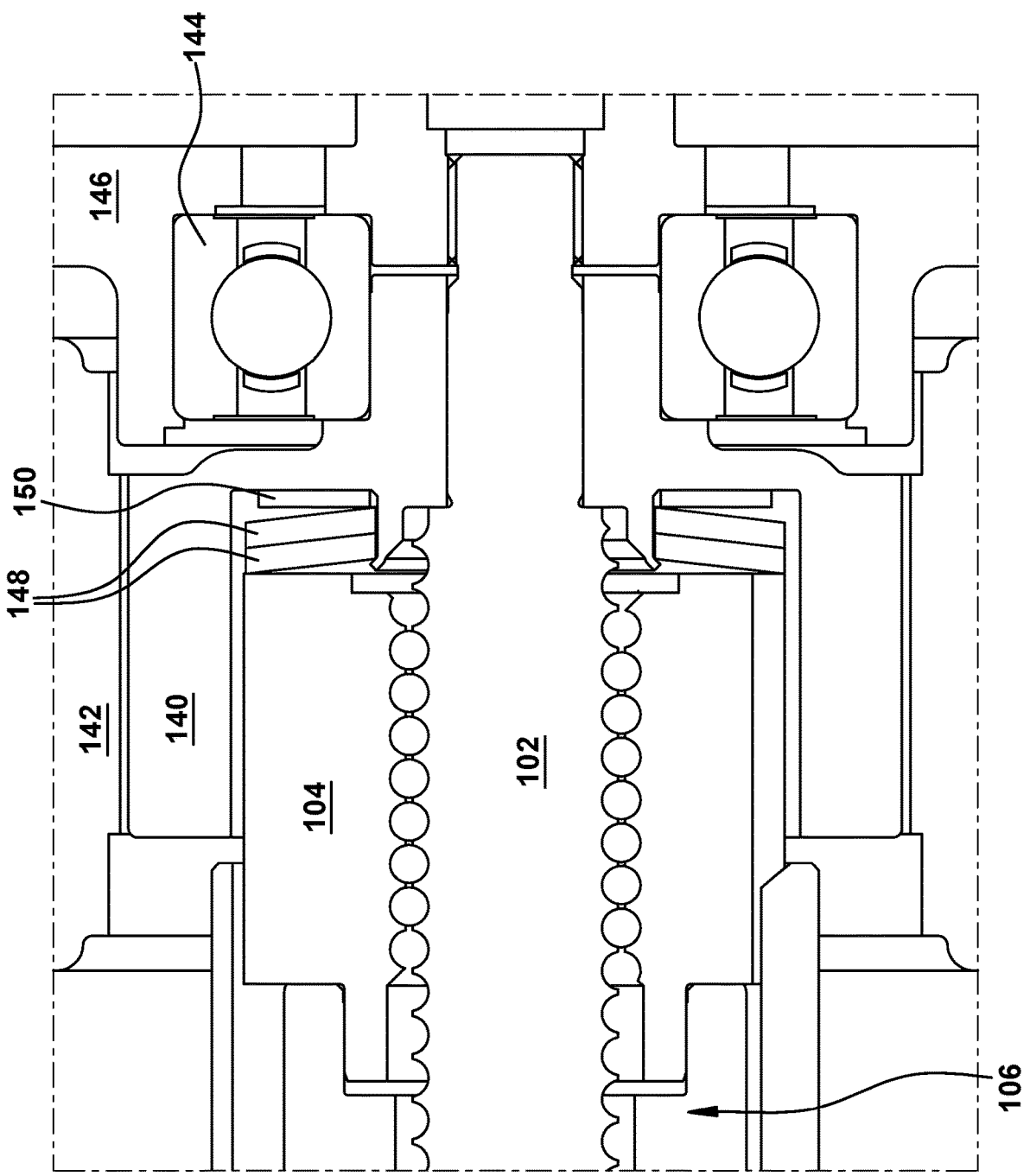
FIG. 2 is an enlarged view of area "2" of FIG. 1.

A bearing 144, which may be, for example, a four-point contact bearing, rotatably supports a supported end of the ball screw 102 at a location spaced apart from the primary chamber. The motor rotor 140 is interposed longitudinally between the ball nut 104 and the bearing 144. The motor housing 138 includes a bearing retainer 146 to maintain the bearing 144 in position, in relation to the motor housing 138. This arrangement is shown schematically in detail in FIG. 2. With reference to FIG. 2, at least one disc spring 148 (A.K.A. "Belleville washer", two shown) may be longitudinally interposed between the ball nut 104 and the bearing 144. As schematically depicted in FIG. 2, the disc springs 148 may be separated from the bearing 144 by at least a portion of a cup-shaped motor rotor 140. Additionally as shown, a washer 150 may be included in the stack, for desired wear resistance and/or rotatability reasons—in this instance, the washer 150 may be of a harder material than the material of the motor rotor 140. When present, the disc springs 148 may selectively compress under longitudinal force directed from the ball nut 104 toward the bearing 144, and may be helpful in cushioning a rotating stop of the ball nut 104 to avoid undesirable friction lock.

An electronic control unit housing 152 may be selectively connected to a portion of the block housing 110 spaced longitudinally apart from the primary and secondary chambers 112 and 116. The electronic control unit housing 152 encloses an electronic control unit 154 therein for operative connection to the electric motor 136. When a bearing retainer 146 is provided, such as in the arrangement shown in FIGS. 1-2, the bearing retainer 146 may be interposed longitudinally between the electronic control unit 154 and the electric motor 136 for preventing fluid communication therebetween, and may be provided with any desired o-rings or other seals to facilitate such sealing.

With reference back to FIG. 1, each of the primary and secondary chambers 112 and 116 may include at least one annular sealing groove 156 configured to contain an annular seal 158, of any desired type, for resisting egress of hydraulic fluid from the respective primary or secondary chamber 112 or 116 in an undesirable direction. For example, a v-seal could be provided to a rightmost (in the orientation of FIG. 1) sealing groove 156 of at least one of the primary and secondary chambers 112 and 116, and a w-seal, or recup seal, could be provided to a more leftwardly oriented (in the orientation of FIG. 1) sealing groove 156 of at least one of the primary and secondary chambers 112 and 116, to provide desired sealing properties in a particular use environment. This is the arrangement shown, by way of example, in FIG. 1.

At least one of the primary and secondary pistons 106 and 108 includes a concave cup portion 160 having an interior surface at least partially defined by a respective face of the piston 106 or 108. The cup portion 160 at least partially defines a respective primary or secondary chamber 112 or 116. In the arrangement shown in FIG. 1, both of the primary and secondary pistons 106 and 108 includes a cup portion 160. A plurality of apertures 161 may be provided to any of the cup portions 162 facilitate transfer of hydraulic fluid between a respective primary and secondary chamber 112 and 116 and their corresponding reservoir chambers.

At least one of the primary and secondary pistons 106 and 108 may include a cage structure 162 carried by the face 114 or 118 of the selected piston(s) 106 or 108 and extending from the face 114 or 118 into a respective primary or secondary chamber 112 or 116. When present, the cage structure 162 and cup portion 160 collectively define an annular cavity 164 therebetween. The annular cavity 164 is substantially coaxial with the respective primary or secondary chamber 112 or 116. At least one of the primary and secondary springs 128 and 130, corresponding to the respective primary or secondary chamber 112 or 116, may be at least partially contained within the annular cavity 164. As a result, the primary or secondary spring 128 or 130 which is at least partially contained within the annular cavity 164 may be guided for compression and/or prevented from buckling, due to the presence of the cage structure 162 within the lumen of the primary or secondary spring 128 or 130. Whether or not a cage structure 162 is provided, however, the primary or secondary spring 128 or 130 is operative to selectively resist longitudinally compressive force developed in the respective primary or secondary chamber 112 or 116, as previously discussed.

As one example of a feature of the tandem PTU 100 that assists with achieving desired fluid pressurization results, FIG. 1 depicts a situation in which the primary piston 106 includes the cage structure 162 and carries the cage structure 162 there with reciprocally longitudinally with respect to the block housing 110. In the depicted arrangement, the cage structure 162 includes a central cage aperture 164 at a cage end face 166 spaced longitudinally apart from the face 114 of the primary piston 106. The secondary piston 108, in the arrangement depicted in FIG. 1, carries a longitudinally extending pin 170 protruding from the backside 120 of the secondary piston 116. The longitudinally extending pin 170 penetrates slidingly through the central cage aperture 164 for selectively limiting longitudinal travel of the secondary piston 108 relative to the primary piston 106. That is, when the primary spring 128 compresses sufficiently to allow the rightmost (in the orientation of FIG. 1) end of the pin 170 to contact and interior of the cup portion 160 of the primary piston 106, the formerly variable connection between the primary and secondary pistons 106 and 108 (provided at least partially by the primary spring 128) becomes substantially rigid and the primary piston 106 can exert force upon the pin 170 to urge the secondary piston 108 longitudinally within the block housing 110.

It should be noted that, for many use environments of the tandem PTU 100, the primary and secondary pistons 106 and 108 need not be coupled to each other to reset into the fully retracted position shown in FIG. 1. Instead, force exerted by one or both of the primary and secondary springs 128 and 130 may be operative to urge one or more of the primary and secondary pistons 106 and 108 into the depicted position, upon retraction of the ball nut 104 which pulls the primary piston 106 toward the right, in the orientation of FIG. 1.

Primary and secondary reservoir channels 172 and 174 may be provided to the block housing 110 to place the primary and secondary chambers 112 and 116, respectively, into fluid communication with a reservoir of a brake system, as will be described below. The reservoir may be attached directly to the block housing 110, using a coupling feature 176 such as the depicted hole and a separately provided cotter pin or other fastener (not shown), or in any other desired manner. One of ordinary skill in the art will be able to readily provide a suitable arrangement for achieving desired couplings for a particular use environment of the tandem PTU 100.

For connection of the tandem PTU 100 to a brake system 178, as will be described below, a primary output line 180 is in fluid connection with the primary chamber 112 (such as via the first output channel 132) and a secondary output line 182 is in fluid connection with the secondary chamber 116 (such as via the second output channel 134). The primary and secondary output lines 180 and 182 are shown schematically in FIG. 1, and may be provided to a particular brake system 178 by one of ordinary skill in the art.

Figure 3:
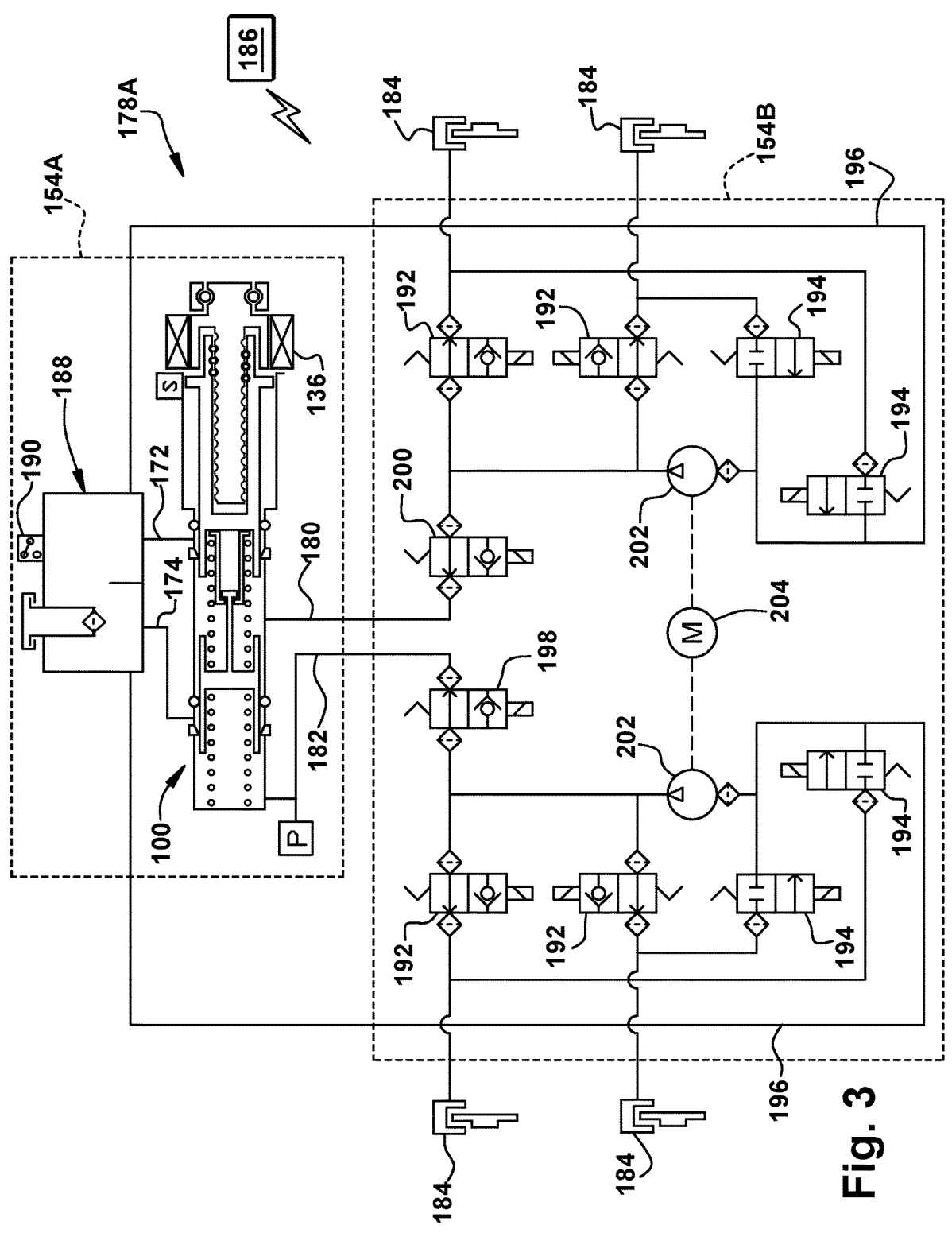
FIG. 3 is a schematic hydraulic diagram of a first example brake system including the tandem power transmission unit of FIG. 1.
Figure 4:
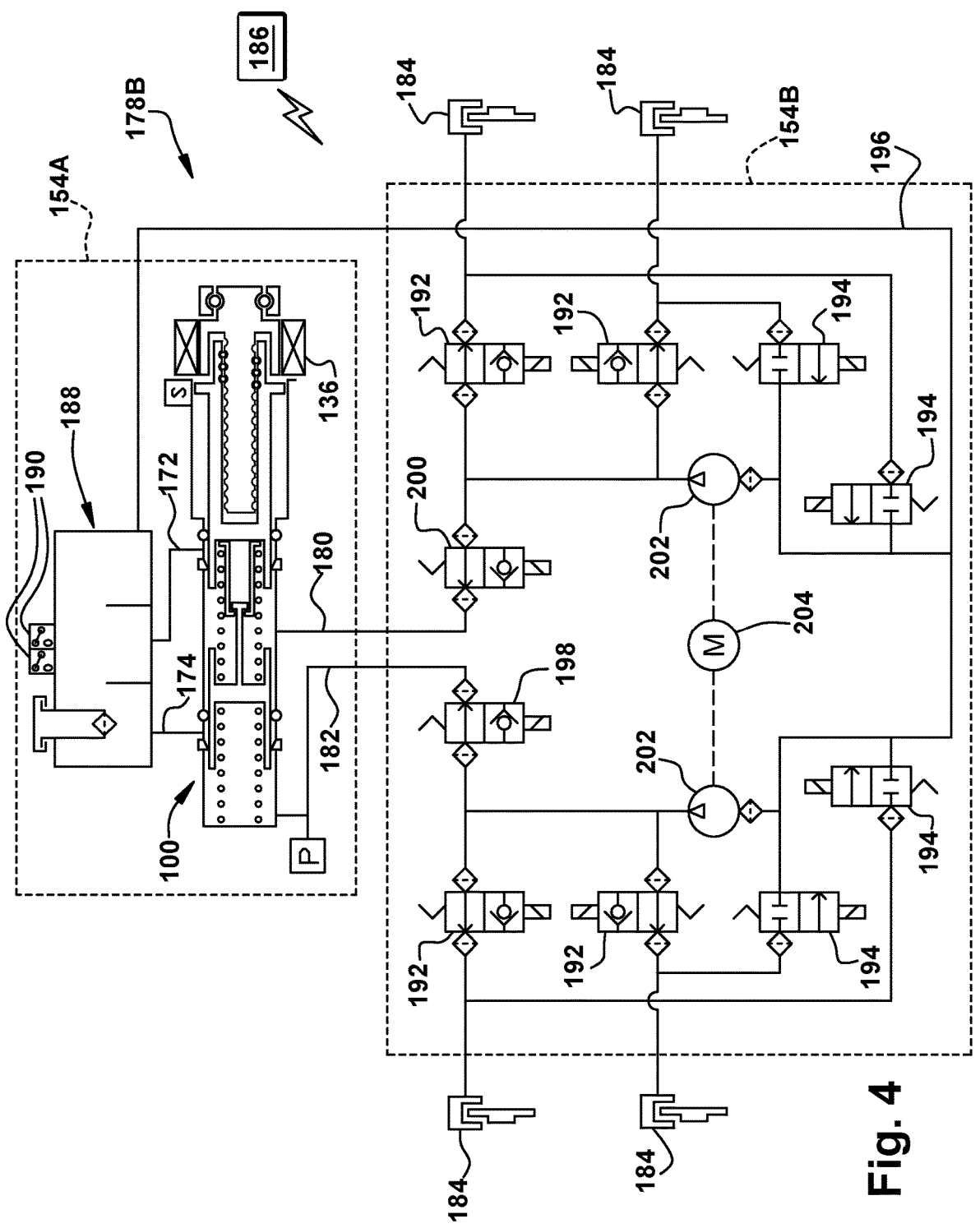
FIG. 4 is a schematic hydraulic diagram of a second example brake system including the tandem power transmission unit of FIG. 1.

FIGS. 3-4 schematically depict first and second example brake systems 178A and 178B, respectively, for actuating a plurality of wheel brakes 184. The brake system 178A and 178B are shown here as hydraulic braking systems, in which fluid pressure is utilized to apply braking forces for the brake systems 178A and 178B. The brake systems 178A and 178B may suitably be used on a ground vehicle, such as an automotive vehicle having four wheels with a wheel brake associated with each wheel. Furthermore, the brake systems 178A and 178B can be provided with other braking functions such as anti-lock braking (ABS) and other slip control features to effectively brake the vehicle. Components of the brake systems 178A and 178B may be housed in one or more blocks or housings. The blocks or housings may be made from solid material, such as aluminum, that has been drilled, machined, or otherwise formed to house the various components. Fluid conduits may also be formed in the block or housing.

In the illustrated embodiments of the brake system 178A and 178B of FIGS. 3-4, there are four wheel brakes 184, which each can have any suitable wheel brake structure operated electrically and/or by the application of pressurized brake fluid. Each of the wheel brakes 184 may include, for example, a brake caliper mounted on the vehicle to engage a frictional element (such as a brake disc) that rotates with a vehicle wheel to effect braking of the associated vehicle wheel. The wheel brakes 184 can be associated with any combination of front and rear wheels of the vehicle in which the corresponding brake system 178A or 178B installed. For example, the brake systems 178A and 178B may each be configured as a vertically split or diagonally split system. No differentiation is made herein among the wheel brakes 184, for the purposes of this description, though one of ordinary skill in the art could readily provide a suitable braking arrangement for a particular use environment.

Also for the sake of description, it is presumed that a deceleration signal transmitter (shown schematically at 186) is configured to provide a braking signal, in a wired or wireless manner, corresponding to a desired braking action by an operator of the vehicle. The deceleration signal transmitter 186 could include, but not be limited to, a brake pedal, an autonomous braking controller, and/or any other suitable scheme for generating a braking signal from which the brake system 178A or 178B can be actuated.

The brake systems 178A and 178B also include a fluid reservoir 188. The reservoir 188 stores and holds hydraulic fluid for the brake system 178A or 178B. The fluid within the reservoir 188 is preferably held at or about atmospheric pressure, but the fluid may be stored at other pressures if desired. The reservoir 188 is shown schematically having three tanks or sections with fluid conduit lines connected thereto. The sections can be separated by several interior walls within the reservoir 188 and are provided to prevent complete drainage of the reservoir 188 in case one of the sections is depleted due to a leakage via one of the three lines connected to the reservoir 188. Alternatively, the reservoir 188 may include multiple separate housings. The reservoir 188 may include at least one fluid level sensor 190 (two shown in FIG. 4, for redundancy) for detecting the fluid level of one or more of the sections of the reservoir 188.

The tandem PTU 100 of each brake system 178A, 178B functions as a source of pressure to provide a desired pressure level to the hydraulically operated wheel brakes 184 during a typical or normal non-failure brake apply. After a brake apply, fluid from the wheel brakes 184 may be returned to the tandem PTU 100 and/or be diverted to the reservoir 188. It is also contemplated that other configurations (not shown) of the brake system 178 could include hydraulic control of just selected one(s) of the wheel brakes (with the others being electrically controlled/actuated). One of ordinary skill in the art would be readily able to provide such an arrangement for a desired use environment, following aspects of the present invention.

An iso/dump control valve arrangement is associated with each wheel brake 184 of the plurality of wheel brakes 184. Each iso/dump control valve arrangement includes an iso valve 192 and a dump valve 194, for providing desired fluid routing to an associated wheel brake 184. The reservoir 188 is hydraulically connected to the tandem PTU 102 each of the iso/dump control valve arrangements, such as via the return lines 196 (two shown in FIG. 3, one shown in FIG. 4). The iso/dump control valve arrangements each include respective serially arranged iso and dump valves 192 and 194. The normally open iso valve 192 for each iso/dump control valve arrangement is located hydraulically between a respective wheel brake 184 and the tandem PTU 100, and the normally closed dump valve 194 for each iso/dump control valve arrangement is located hydraulically between a respective wheel brake 184 and the reservoir 188, for the corresponding wheel brake 184.

The iso/dump control valve arrangements may selectively provide slip control to at least one wheel brake 184 powered by the tandem PTU 100 and/or the pump/motor unit described below. More broadly, the iso/dump control valve arrangement, and/or other valves of the brake system 100, any of which may be solenoid-operated and have any suitable configurations, can be used to help provide controlled braking operations, such as, but not limited to, ABS, traction control, vehicle stability control, dynamic rear proportioning, regenerative braking blending, and autonomous braking.

A first traction control iso valve 198 is hydraulically interposed between the tandem PTU 100 and at least one iso/dump control valve arrangement via the first output channel 132 (here, via primary output line 180). A second traction control iso valve 200 is hydraulically interposed between the tandem PTU 100 and at least one iso/dump control valve arrangement via the second output channel 134 (here, via secondary output line 182).

A pump piston 202 is associated with at least one wheel brake 184 of the plurality of wheel brakes 184. The pump piston 202 is driven by a second electric motor 204 (as differentiated from the electric motor 136 included in the tandem PTU 100) for selectively providing pressurized hydraulic fluid to the iso/dump control valve arrangement of at least one wheel brake 184 which is associated with the pump piston 202. In FIGS. 3-4, one pump piston 202 is associated with two wheel brakes 184, for a total of two pump pistons 202 in the brake system 178A or 170B. Together, the pump piston(s) 202 and second electric motor 204 can be considered to comprise a secondary brake module of the brake systems 178A, 178B.

The secondary brake modules of the brake systems 178A, 178B function as a source of pressure to provide a desired pressure level to selected ones of the wheel brakes 184 in a backup or "failed" situation, when, for some reason, the tandem PTU 100 is unable to provide fluid to those selected wheel brakes 184. The secondary brake modules can be used to selectively provide hydraulic fluid to at least one of the wheel brakes 184 in a backup braking mode, but also in an enhanced braking mode, which can occur on its own and/or concurrently with either the backup braking mode or a non-failure normal braking mode. Examples of suitable enhanced braking mode functions available to the brake systems 178A, 178B include, but are not limited to, "overboost" (in which higher pressure is provided to a particular brake than would normally be available from the tandem PTU 100 alone) and "volume-add" (in which more fluid is provided to a particular brake than would normally be available from the tandem PTU 100). One of ordinary skill in the art will be readily able to configure a brake system 178 for any particular use application as desired.

The brake systems 178A, 178B shown in FIGS. 3-4 also include at least one electronic control unit ("ECU") 154, with first and second ECUs 154A, 154B being shown and described herein (and depicted schematically in FIGS. 3-4 by dashed lines indicating the power source—electric motor for PTU and/or pump piston[s]—under their respective influence). The ECUs 154A, 154B may include microprocessors and other electrical circuitry. The ECUs 154A, 154B receive various signals, process signals, and control the operation of various electrical components of a corresponding brake system 178 in response to the received signals, in a wired and/or wireless manner. The ECUs 154A, 154B can be connected to various sensors such as the reservoir fluid level sensor(s) 190, pressure sensors, travel sensors, switches, wheel speed sensors, and steering angle sensors. The ECUs 154A, 154B may also be connected to an external module (not shown) for receiving information related to yaw rate, lateral acceleration, longitudinal acceleration of the vehicle, or other characteristics of vehicle operation for any reason, such as, but not limited to, controlling the brake system 100 during vehicle braking, stability operation, or other modes of operation. Additionally, the ECUs 154A, 154B may be connected to the instrument cluster for collecting and supplying information related to warning indicators such as an ABS warning light, a brake fluid level warning light, and a traction control/vehicle stability control indicator light. It is contemplated that at least one of the ECUs 154A and 154B may be, for example, integrated into the tandem PTU 100, such as that shown and described with reference to FIG. 1.

The first ECU 154A is operative to control the electric motor 136 of the tandem PTU 100, as shown in FIGS. 3-4. The second ECU 150 4B is operative to control the second electric motor 204, at least one of the iso/dump control valve arrangements, and at least one of the first and second traction control iso valves 198, 200. An example of a suitable ECU 154 arrangement is disclosed in co-pending U.S. patent application Ser. No. 17/708,019, filed concurrently herewith and titled "Control Arrangement for a Brake System", hereafter referenced as "the backed-up ECU"), which is incorporated by reference herein in its entirety for all purposes.

In a plurality of the brake systems 178 shown and described herein, the pump pistons 202 are able to pull hydraulic fluid directly from the reservoir 188. During certain phases of operation, the pump pistons 202 may provide pressurized fluid to the tandem PTU 100 via the primary and/or secondary output lines 180, 182, in a manner that tends to "backdrive" the tandem PTU 100. Because there is no brake pedal attached to the tandem PTU 100 this "backdrive" feature may be desirable in some circumstances to facilitate brake venting, to avoid working the electric motor 136 and the second electric motor 204 against each other, or for any other desired reason.

In the brake system 178A shown in FIG. 3, each pump piston 202 is able to route fluid directly to and from the reservoir 188 via the pair of return lines 196, as desired. In contrast, in the brake system 178B shown in FIG. 4, a single return line 196 places the reservoir 188 and each pump piston 202 (i.e., all of the pump pistons 202 of the brake system 178B) in direct hydraulic connection for this brake system 178 B shown in FIG. 4, the reservoir 188 includes first and second reservoir fluid sensors 190, with each of the first and second reservoir fluid sensors 190 being in electronic communication with respective first and second electronic control units 154A, 154B. As a result, even if one of the ECUs 154A, 154B is not available to the brake system 178B for some reason, fluid levels in the reservoir 188 can be monitored and adjusted via control of either the electric motor 136 or the second electric motor 204, depending upon which of the ECUs 154A, 154B is still available within the brake system 178B at that time.

Figure 5:
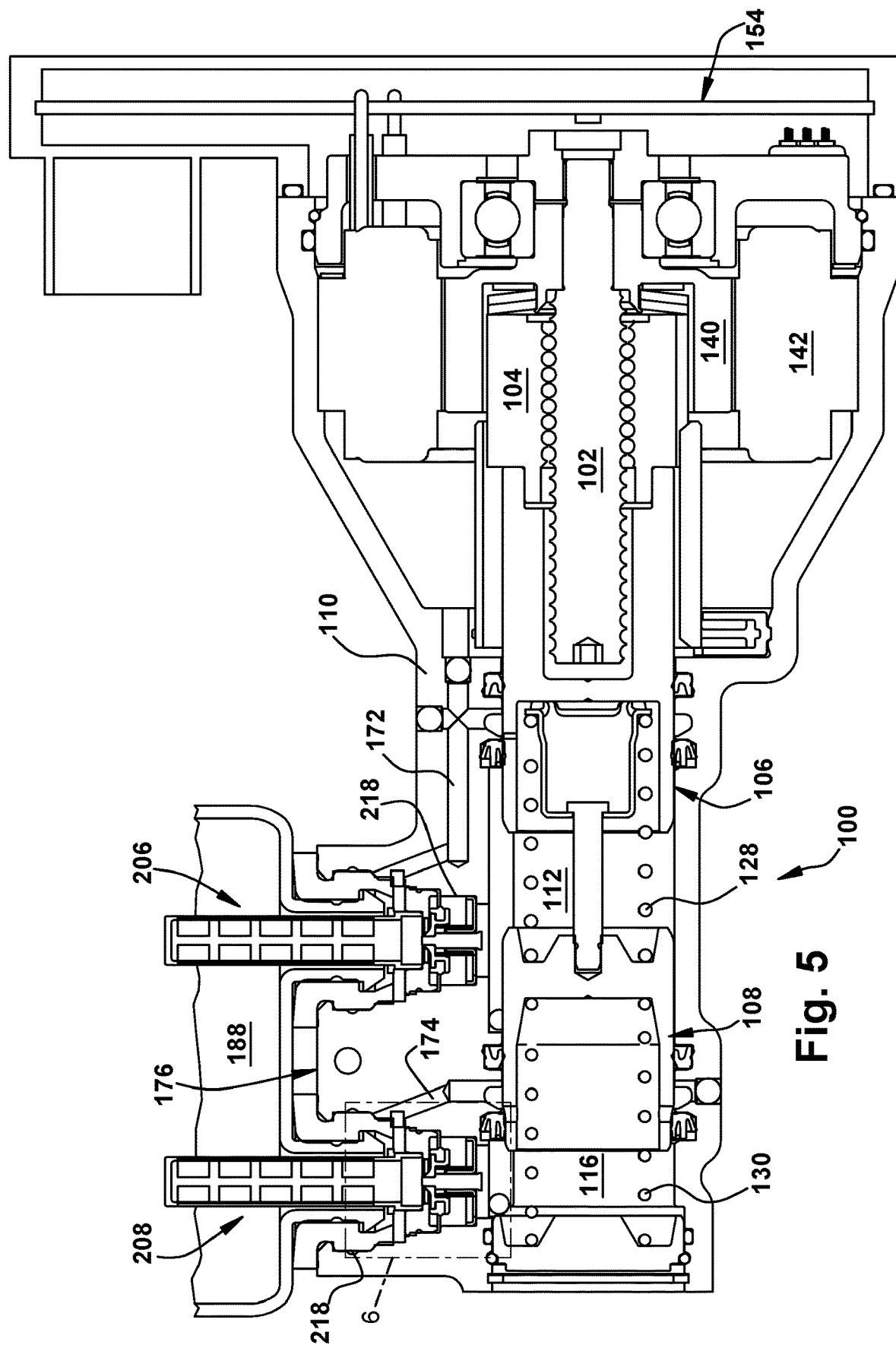
FIG. 5 is a schematic partial cross-sectional view of a tandem power transmission unit according to an aspect of the present invention, in a second configuration.
Figure 6:
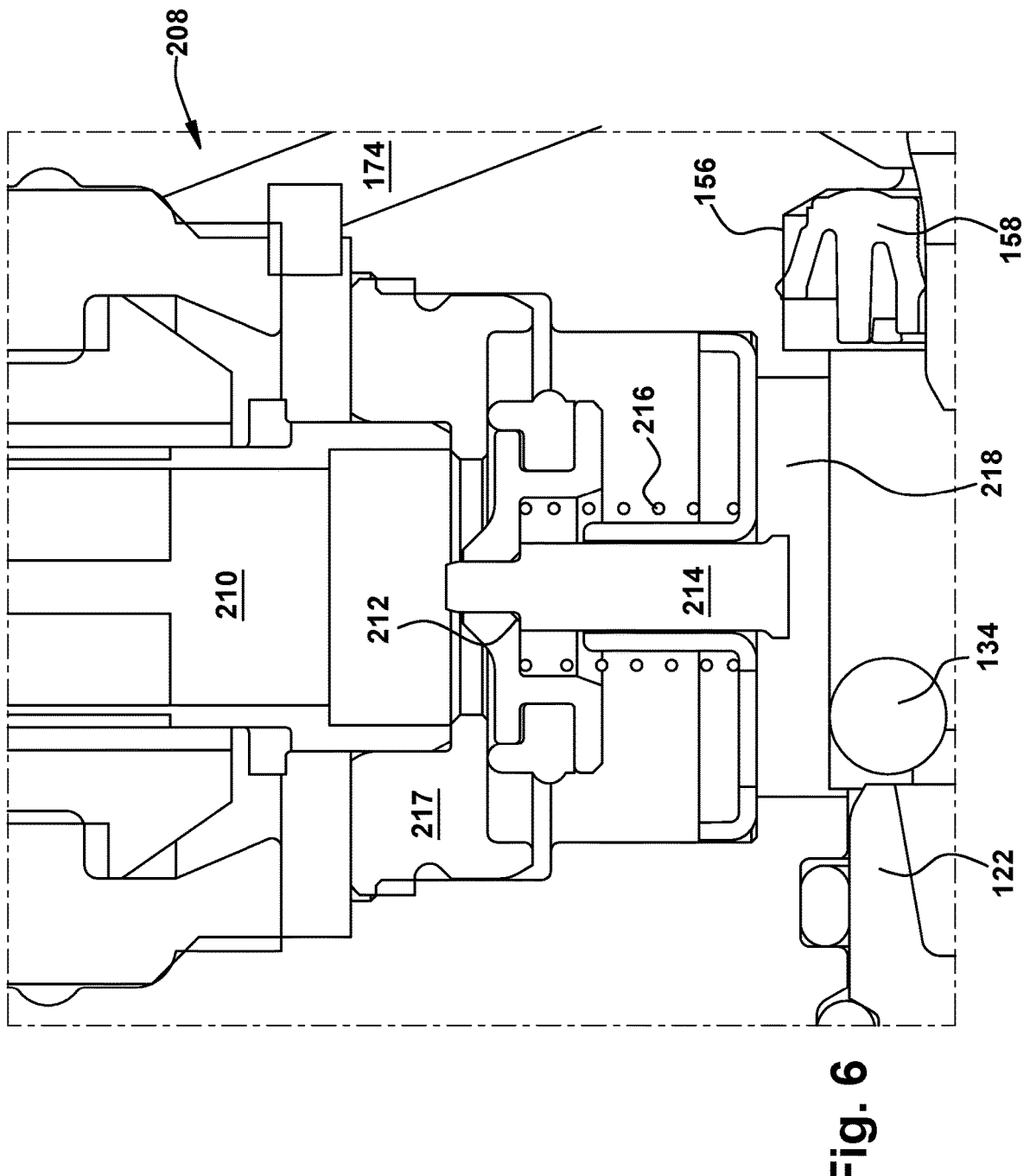
FIG. 6 is an enlarged view of area "6" of FIG. 5.

FIGS. 5-6 illustrate a second embodiment of a tandem PTU 100. The tandem PTU 100' of FIGS. 5-6 is similar to the tandem PTU of FIGS. 1-2 and therefore, structures of FIGS. 5-6 that are the same as or similar to those described with reference to FIGS. 1-2 have the same reference numbers. Description of common elements and operation similar to those in the previously described first embodiment will not be repeated with respect to the second embodiment, but should instead be considered to be incorporated below by reference as appropriate.

The tandem PTU 100' shown in FIGS. 5-6 is a version wherein each of the primary and secondary reservoir channels 172, 174 includes a replenishing check valve (first and second check valves 206, 208 shown in the Figures) interposed hydraulically between a reservoir 188 and a respective primary or secondary chamber. With particular reference to the detail view of FIG. 6 (only the second check valve 208 is shown in this detail Figure; first check valve 206 is configured analogously), the second check valve 208 includes a filter 210, a valve poppet 212, a pin 214 press-fit with the valve poppet 212, and a return spring 216 to resist fluid pressure from the secondary chamber 116 to the reservoir 188 (e.g., via movement of a seal fitted on the valve poppet 212 against a valve seat 217 that is clinch-fit into the block housing 110). Each replenishing check valve 206 and 208 is maintained within a corresponding check valve cavity 218 of the block housing 110. Each check valve cavity 218 is in fluid communication with a respective primary or secondary chamber 112 or 116, as shown in FIGS. 5-6.

The secondary reservoir channel 174, as shown in FIG. 6, facilitates return of fluid from the secondary chamber 116 to the reservoir, and fluid is allowed to travel through the valve seat 217 into the secondary chamber 116, under a negative pressure influence from the secondary chamber 116. More broadly, each of the first and second replenishing check valves 206 and 208, as shown in FIG. 5, is operable to selectively route hydraulic fluid from the reservoir 188 to a respective primary or secondary chamber 112 or 116. For many use environments, this selective routing will be done when the electric motor 136 is rotating the ball screw 102. One of ordinary skill in the art will be readily able to configure a suitable replenishing check valve arrangement for a particular use environment of the tandem PTU 100'.

The tandem PTU 100' of FIGS. 5-6 is provided for use in the brake systems 178 of FIGS. 7-11, each of which will be briefly described below. Again, common and analogous structures and functions to those already described above will be omitted from the below description of FIGS. 7-11, for brevity. Again, four wheel brakes 184 are shown in each of these Figures, and one of ordinary skill in the art will be able to provide suitable placement of each of the wheel brakes 184 upon a vehicle, for a particular use environment.

Figure 7:
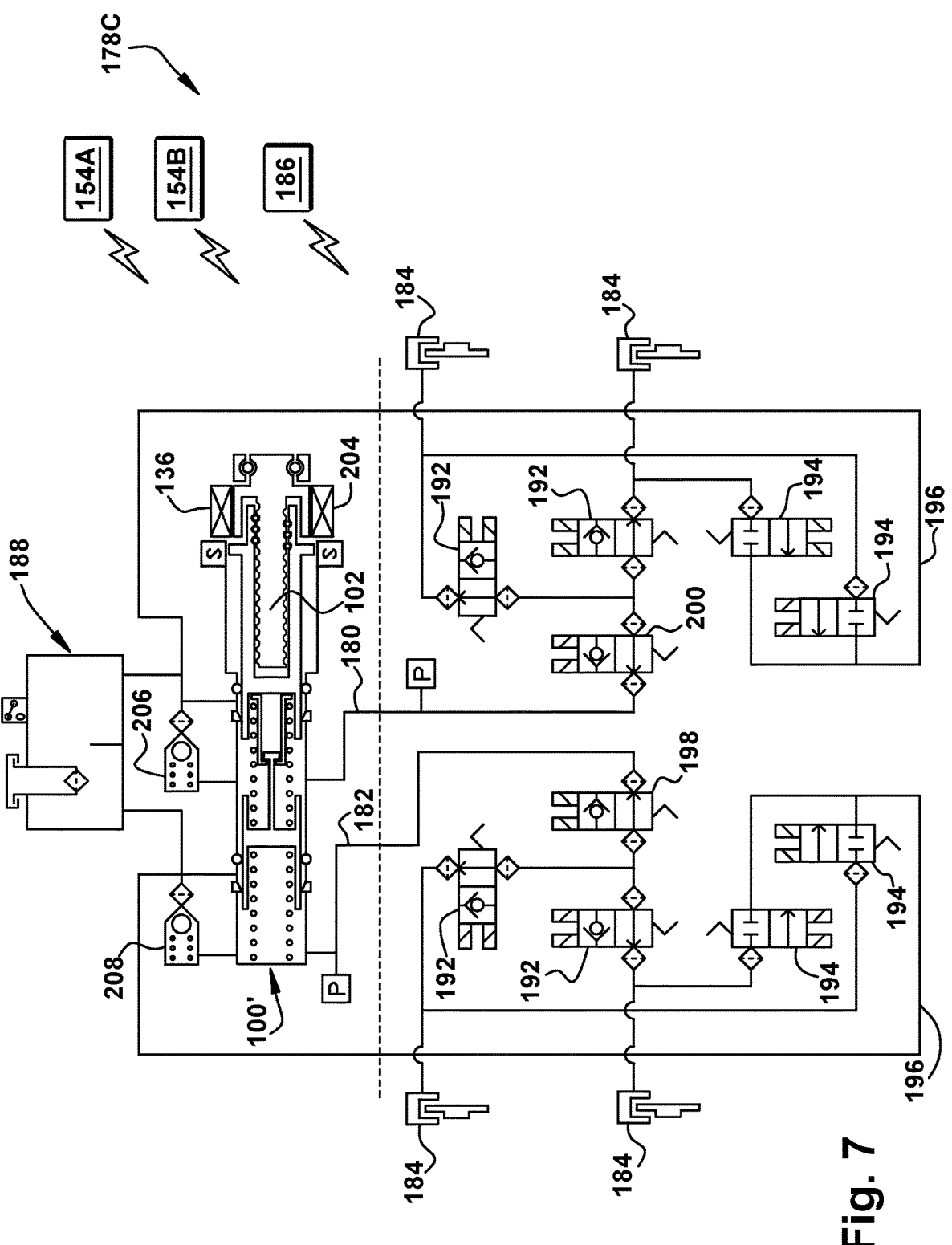
FIG. 7 is a schematic hydraulic diagram of a third example brake system including the tandem power transmission unit of FIG. 5.

The brake system 178C of FIG. 7 does not include any pump pistons 202 for providing a desired backup function in the event of failure of one of the first and second ECUs 154A or 154B. Instead, the electric motor 136 is a first electric motor 136 for operation of the tandem PTU 100' in a first braking mode (e.g., the normal non-failure braking mode), and the tandem PTU 100' includes a second electric motor 204 for selectively driving the ball screw 102 to responsively reciprocate at least one of the primary and secondary pistons 106 and 108 within a corresponding primary or secondary chamber 112 or 116 in a second braking mode (e.g., a backup braking mode). It is contemplated here that a single electric motor 136 could be of a dual-wound type, and include first and second windings, rather than entire first and second motor 136, 204 structures—for ease of reference, a first winding 136 will be considered substantially equivalent to a first electric motor 136, and a second winding 204 (of the same motor) will be considered substantially equivalent to a second electric motor 204, for brevity herein. Since the pump pistons 202 are absent from the brake system 178C of FIG. 7, the tandem PTU 100' needs to build pressure on its own, and thus there is a need for fast replenishment within the system.

The various iso valves 192, dump valves 194, and first and second traction control iso valves 198 and 200 may be of a "dual wound" type, as indicated by the presence of two solenoids on each valve in the schematic view of the brake system 178C of FIG. 7. As a result, both of the first and second ECUs 154A and 154B are capable of operating these "dual wound" valves as desired. Through the redundancy of the electric motors on the tandem PTU 100' and on the dual windings of the valves of the brake system 178C, either of the first and second ECUs 154A and 154B is capable of controlling the entire brake system 178 C, should the other ECU be unavailable.

It is contemplated that, instead of the dual windings on the valves, the backed up ECU previously mentioned could be instead used with the brake system 178C of FIG. 7.

It is also contemplated that a selected one of the first and second ECUs 154A and 154B could be a "working" ECU and the other one could be a "backup" ECU, stepping in upon failure of the "working" ECU (either after shadowing the "working" ECU or immediately when pressed into action as a substitute). The same one of the first and second ECUs 154A and 154B could be the "working" version during normal operation of the vehicle, or this role could switch between ECUs during normal operation upon a predetermined schedule, as desired.

In summary, in the brake system 178C shown in FIG. 7, at least the first ECU 154A is operative to control the (first) electric motor 136 of the tandem PTU 100', the iso/dump control valve arrangements (comprising iso valves 192 and dump valves 194), and at least one of the first and second traction control iso valves 198 and 200 under the first braking mode. Analogously, at least the second ECU 154B is operative to control the second electric motor 204 associated in this brake system 178C with the tandem PTU 100', the iso/dump control valve arrangements (comprising iso valves 192 and dump valves 194), and at least one of the traction control iso valves 198 and 200 under the second braking mode.

Figure 8:
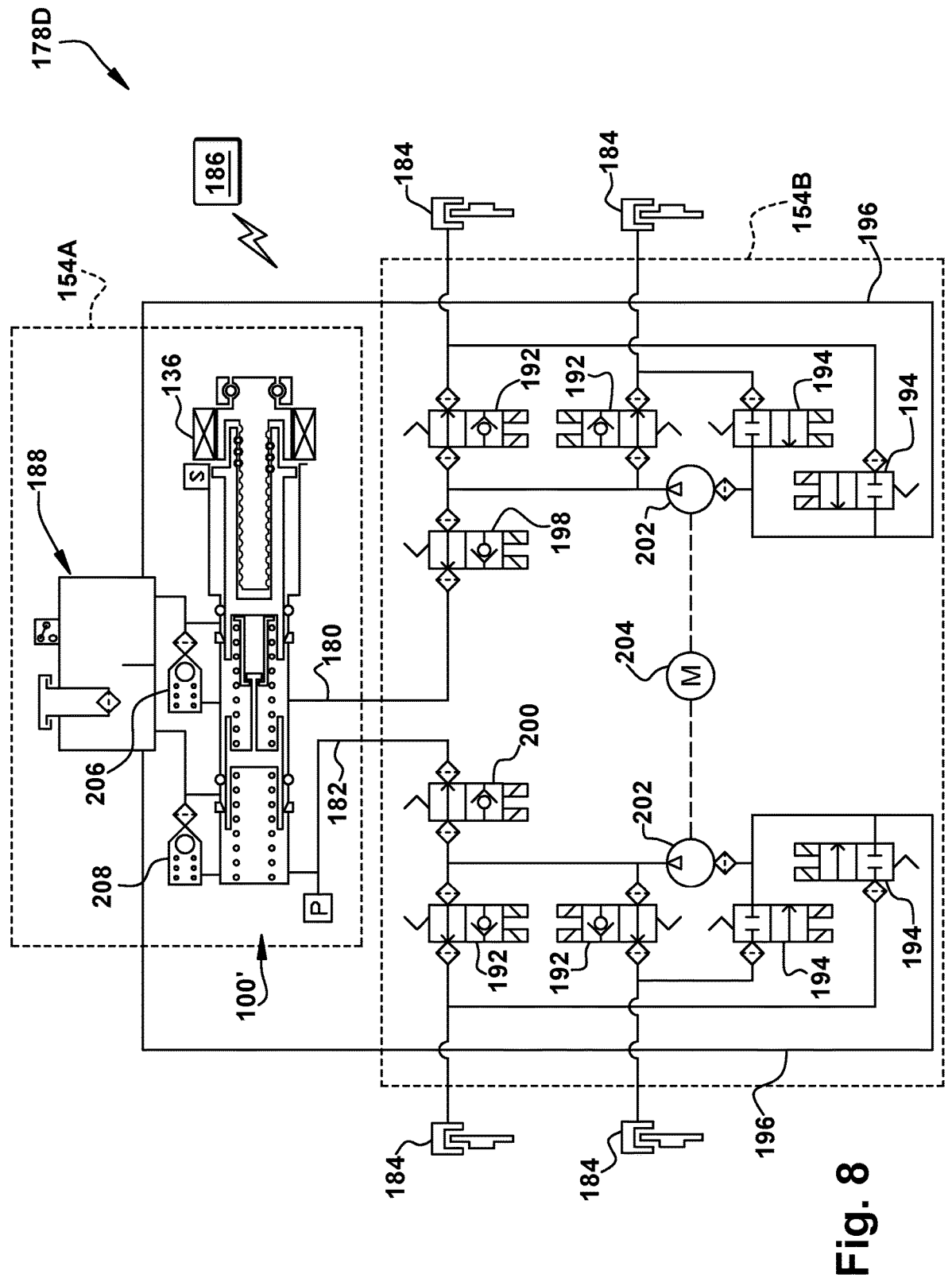
FIG. 8 is a schematic hydraulic diagram of a fourth example brake system including the tandem power transmission unit of FIG. 5.

Turning now to FIG. 8, the brake system 178D shown therein bears similarities to the brake system 178A of FIG. 3. In FIG. 8, the tandem PTU 100' once again includes only the single electric motor 136, and the second electric motor 204 is operative to power at least two pump pistons 202. Each pump piston 200 is associated with at least one wheel brake 184 for selectively providing pressurized hydraulic fluid to the iso/dump control valve arrangement of that wheel brake 184. As shown in the example brake system 178D of FIG. 8, each pump piston 202 has two associated wheel brakes 184, and provides pressurized hydraulic fluid to the iso/dump control valve arrangement of both of the associated wheel brakes 184 on that same side of the brake system 178D; there are a total of two pump pistons 202 in the brake system 178D as shown. In the brake system 178 D, boosted braking can be provided using the second electric motor 204 acting through the two pump pistons 202, since the pump pistons 202 can pull fluid directly from the reservoir and are not wholly reliant on fluid coming from the tandem PTU 100' for operation.

All of the iso valves 192, dump valves 194, and the first and second traction control iso valves 198 and 200 are dual wound in the brake system 170D of FIG. 8. As a result, both of the ECUs 154A, 154B are capable of controlling any one or more of these dual wound valves, under first (normal) and/or second (backup) braking modes. Again, the backed up ECU could be used in addition to, or instead of, dual wound valves. It is also contemplated that, should one of the electric motor 136 and the second electric motor 204 fail, the traction control iso valves 198 and 200 could be actuated to allow the other of the electric motor 136 and the second electric motor 204 to carry the burden of supplying pressurized hydraulic fluid to all of the wheel brakes 184.

In summary, in the brake system 178D shown in FIG. 8, at least the first ECU 154A is operative to control the electric motor 136 of the tandem PTU 100', the iso/dump control valve arrangements (comprising iso valves 192 and dump valves 194), and at least one of the first and second traction control iso valves 198 and 200 under the first braking mode. Analogously, at least the second ECU 154B is operative to control the second electric motor 204 associated in this brake system 178D with the pump pistons 202, the iso/dump control valve arrangements (comprising iso valves 192 and dump valves 194), and at least one of the traction control iso valves 198 and 200 under the second braking mode.

Figure 9:
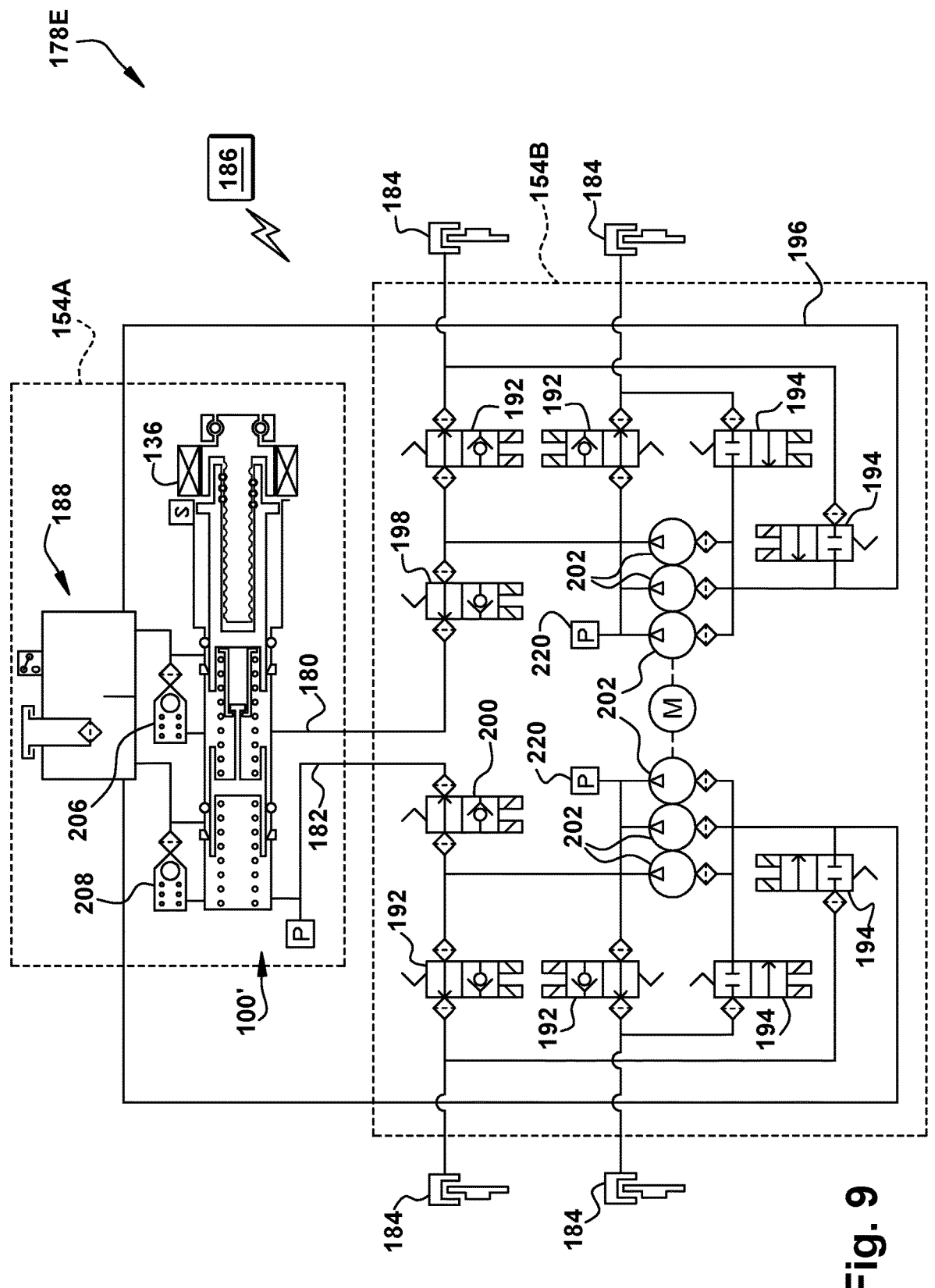
FIG. 9 is a schematic hydraulic diagram of a fifth example brake system including the tandem power transmission unit of FIG. 5.

With reference now to FIG. 9, the brake system 178E depicted therein is substantially similar to the brake system 178D of FIG. 8, except that, in lieu of the single pump pistons 202 associated with a plurality of wheel brakes 184 in the brake system 178D, a plurality of pump pistons 202 (three, as shown here) are associated with each "side" of a plurality of wheel brakes 184 in the brake system 178E. There are, accordingly, six total pump pistons 202 in the brake system 178E, though it should be appreciated that any desired plurality of pump pistons could be ganged together and used to supply fluid to one or more wheel brakes 184. The use of six pump pistons 202 may be helpful in attaining desired balanced pumping rotations in a rotary style pump structure. Simply, however, the plurality of pump pistons 202 associated with one or more wheel brakes 184 allows for enough hydraulic fluid to be pressurized and moved through the system that the brake system 178E has sufficient fluid resources to provide both slip control and boosted braking, in addition to, or instead of, the tandem PTU 100'.

Figure 10:
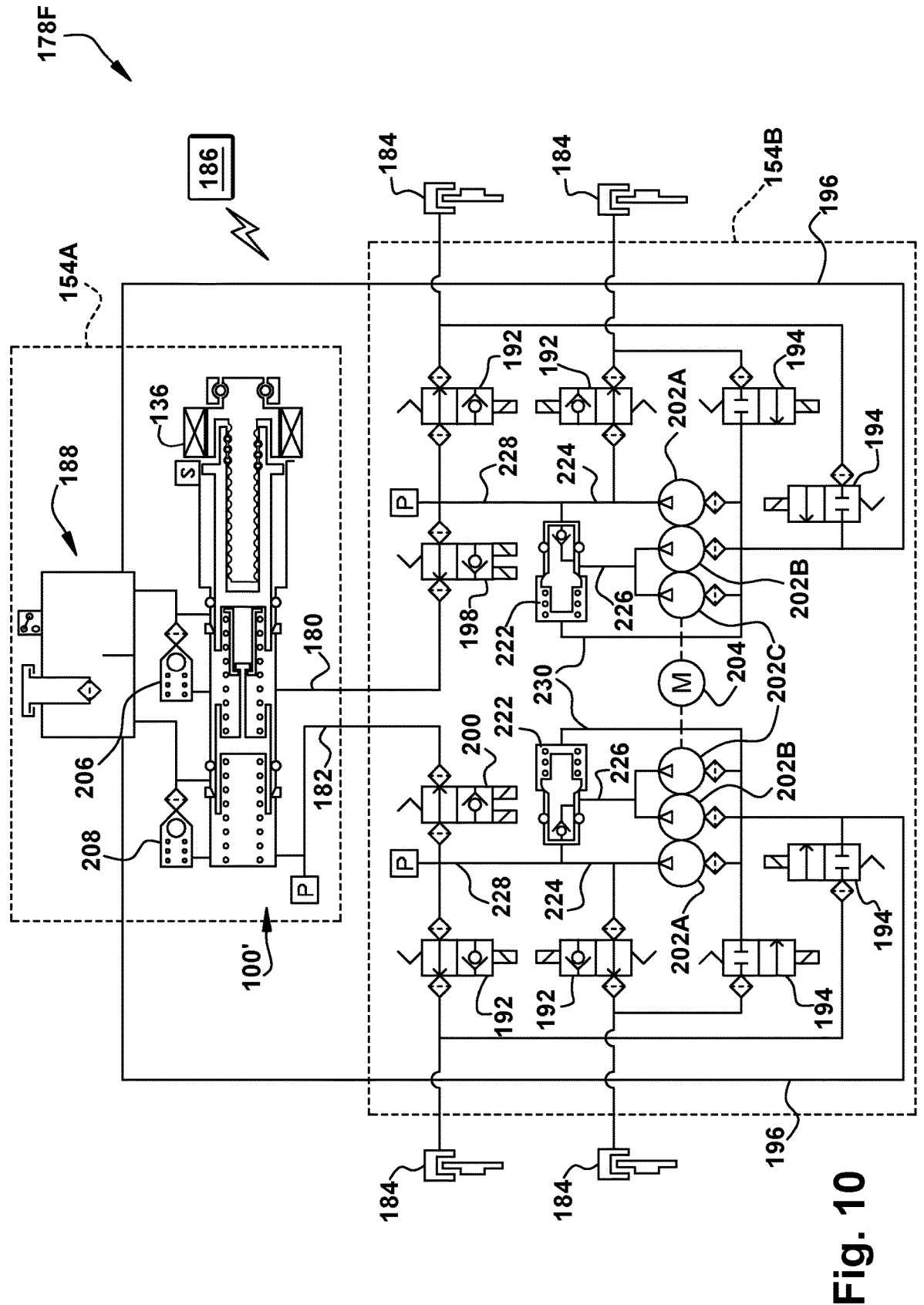
FIG. 10 is a schematic hydraulic diagram of a sixth example brake system including the tandem power transmission unit of FIG. 5.

The brake system 178F of FIG. 10 is substantially similar to the brake system 178E of FIG. 9, with the addition of an unloading valve 222 to each "side" of the second electric motor 204. An example of a suitable unloading valve 222 is disclosed in co-pending U.S. patent application Ser. No. 17/708,048 filed concurrently herewith and titled "Unloading Valve and Brake System Using Same", which is incorporated by reference herein in its entirety for all purposes. The unloading valve 222 is interposed hydraulically between the at least two pump pistons 202 and at least one associated wheel brake 184. Each unloading valve 222 is operatively hydraulically connected to a respective set of pump pistons 202 for selectively operating at least one of the pump pistons 202 in a bypass mode.

More specifically, a primary pump piston 202A is connected to a primary pump inlet 224 of the unloading valve 222, and at least one secondary pump piston (two shown here as 202B and 202C) is fluidly connected to the secondary pump inlet 226 of the unloading valve 222. Each unloading valve 222 is operatively hydraulically connected to a respective set of pump pistons 202 for selectively operating the set of pump pistons 202 in a bypass mode.

That is, the unloading valve 222 operates in a collection mode, aggregating the inputs from all of the associated pump pistons 202A, 202B, 202C into a collective pump outlet 228 during most phases of operation. Then, when there is high pressure developed at the primary pump inlet 224, the unloading valve 222 is permitted to enter the bypass mode to route flow from the secondary pump piston(s) 202B, 202C to the bypass pump outlet 230 and place the secondary pump piston(s) 202B, 202C into a pressure unloaded closed-loop flow configuration.

As shown in FIG. 10, the iso and dump valves 192 and 194 of the brake system 178F are each of a single wound style, and are controlled by the second ECU 154B, along with the second electric motor 204. However, the first and second traction control iso valves 198 and 200 in the brake system 178F are still shown as being dual wound (and/or controlled by the backup ECU, as previously mentioned). As a result, the first and second traction control iso valves 198 in 200 are eligible for control by either of the first and second ECUs 154A and 154B, which may help with redundant control of the system during both normal non-failure and backup braking modes.

Figure 11:
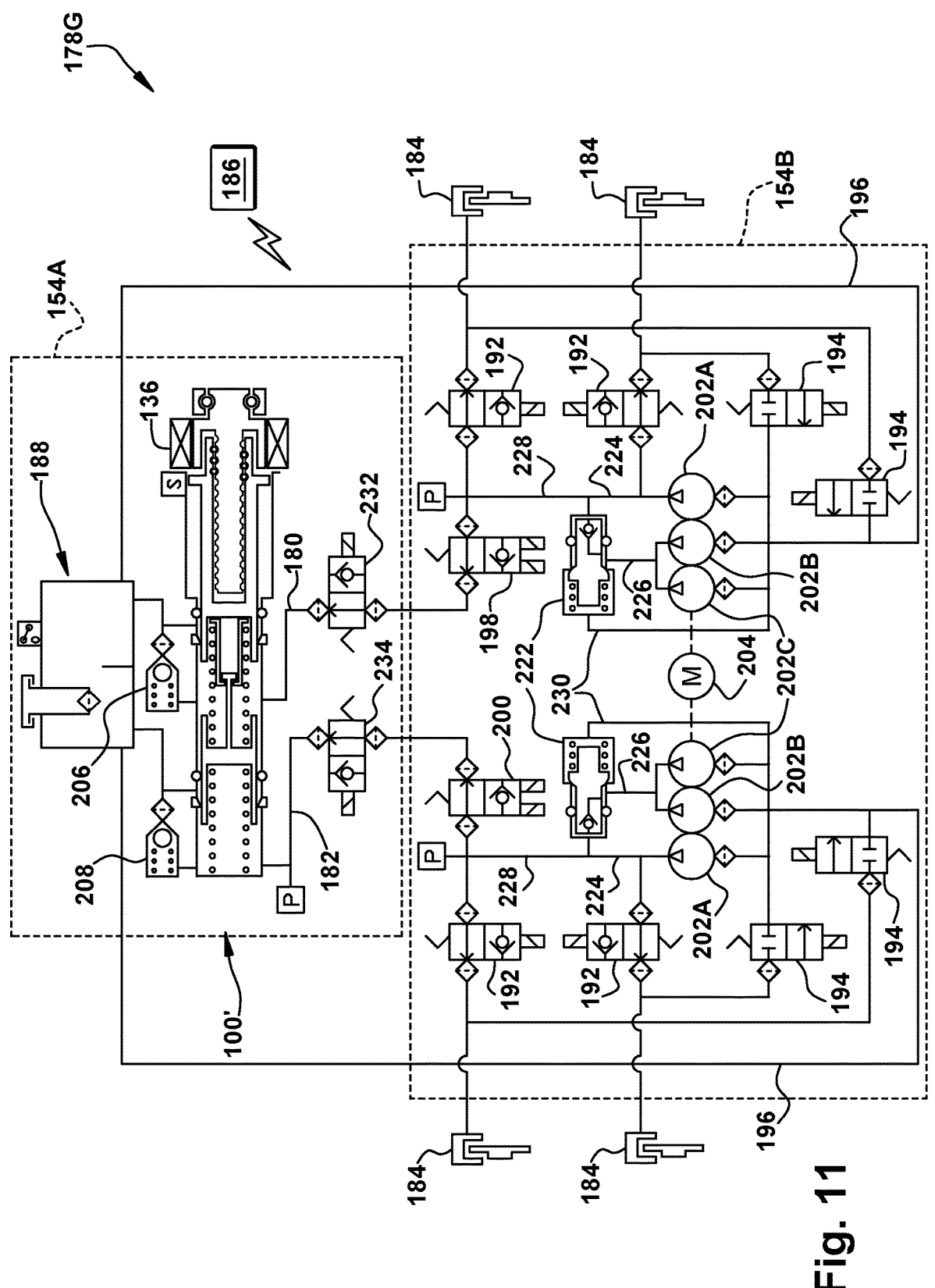
FIG. 11 is a schematic hydraulic diagram of a seventh example brake system including the tandem power transmission unit of FIG. 5.

Finally, with reference to FIG. 11, the brake system 178 G shown therein is substantially similar to the brake system 178 F of FIG. 10. However, in the brake system 178G of FIG. 11, first and second auxiliary traction control iso valves 232 and 234 are provided, and are controlled by the same ECU 154 (here, first ECU 154A) which controls the (first) electric motor 136 of the tandem PTU 100'. Although it is not substantially likely to happen in most use environments, certain failures of the ECU 154 could potentially disable redundant control of the dual wound first and second traction control iso valves 198 and 200. The first auxiliary traction control iso valve 232 is hydraulically interposed between the tandem PTU 100' and the first traction control iso valve 198, via the primary output line 180. The second auxiliary traction control iso valve 234 is hydraulically interposed between the tandem PTU 100' and the second traction control iso valve 200 via the secondary output line 182.

The first ECU 154A is operative to control the electric motor 136 of the tandem PTU 100' and at least one of the traction control iso valves (i.e., the first and second traction control iso valves 198 and 200, and/or the first and second auxiliary traction control iso valves 232 and 234) under a first braking mode;

a second electronic control unit operative to control the second electric motor, the iso/dump control valve arrangements, and at least one of the traction control iso valves (i.e., the first and second traction control iso valves 198 and 200, and/or the first and second auxiliary traction control iso valves 232 and 234) under a second braking mode. As a result of the arrangement of the brake system 170G shown in FIG. 11, the tandem PTU 100' is equipped for replenishment from the reservoir 188, even in the face of an unexpected failure of the first and/or second traction control iso valves 198 and 200.

It is contemplated that various other components, such as electric service and/or parking brake motors, could be provided by one of ordinary skill in the art to achieve desired configurations for particular use environments, in any of the brake systems 178 described herein. For example, while a number of filters and pressure sensors are shown in the Figures, specific description thereof has been omitted herefrom for brevity, as one of ordinary skill in the art will readily understand how to provide a desired number, placement, and/or operation of filters, sensors, and any other components as desired for a particular use environment of the present invention.

As used herein, the singular forms "a", "an", and "the" can include the plural forms as well, unless the context clearly indicates otherwise. It will be further understood that the terms "comprises" and/or "comprising", as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

It will be understood that when an element is referred to as being "on", "attached" to, "connected" to, "coupled" with, "contacting", "adjacent", etc., another element, it can be directly on, attached to, connected to, coupled with, contacting, or adjacent the other element, or intervening elements may also be present. In contrast, when an element is referred to as being, for example, "directly on", "directly attached" to, "directly connected" to, "directly coupled" with, "directly contacting", or "directly adjacent" another element, there are no intervening elements present. It will also be appreciated by those of ordinary skill in the art that references to a structure or feature that is disposed "directly adjacent" another feature may have portions that overlap or underlie the adjacent feature, whereas a structure or feature that is disposed "adjacent" another feature might not have portions that overlap or underlie the adjacent feature.

Spatially relative terms, such as "under", "below", "lower", "over", "upper", "proximal", "distal", and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that, although the terms "first", "second", etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking potentially aiding a user in selecting one component from an array of similar components for a particular use environment. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

I claim:

1. A tandem power transmission unit, comprising:
a ball screw;
a ball nut having an opening into which the ball screw extends, the ball nut being selectively driven by the ball screw for longitudinal motion relative thereto;
a primary piston operatively coupled to the ball nut;
a secondary piston operatively coupled to the primary piston;
a block housing at least partially enclosing the primary piston, the secondary piston, and the ball screw;
a primary chamber at least partially defined by the block housing and a face of the primary piston, the primary chamber being configured to contain hydraulic fluid and selectively pressurized by reciprocal motion of the primary piston with respect to the block housing driven directly by longitudinal motion of the ball nut relative to the block housing;
a secondary chamber at least partially defined by the block housing and a face of the secondary piston, a backside of the secondary piston at least partially defining the primary chamber, the secondary chamber being configured to contain hydraulic fluid and selectively pressurized by reciprocal motion of the secondary piston with respect to the block housing driven indirectly by longitudinal motion of the ball nut relative to the block housing;
a first output channel selectively placing the primary chamber in fluid communication with at least one component of a brake system for provision of pressurized hydraulic fluid thereto;
a second output channel selectively placing the secondary chamber in fluid communication with at least one component of a brake system for provision of pressurized hydraulic fluid thereto;
an electric motor for selectively driving the ball screw to move the ball nut longitudinally relative to the block housing and responsively reciprocate at least one of the primary and secondary pistons within a corresponding primary or secondary chamber; and
a motor housing at least partially enclosing the ball nut and the electric motor.

2. The tandem power transmission unit of claim 1, including a bearing for rotatably supporting a supported end of the ball screw spaced apart from the primary chamber, wherein the motor housing includes a bearing retainer to maintain the bearing in relation to the motor housing.

3. The tandem power transmission unit of claim 2, including at least one disc spring longitudinally interposed between the ball nut and the bearing, the at least one disc spring selectively compressing under longitudinal force directed from the ball nut toward the bearing.

4. The tandem power transmission unit of claim 1, including a primary spring interposed longitudinally between primary and secondary pistons, the primary spring selectively resisting longitudinally directed compressive force therebetween.

5. The tandem power transmission unit of claim 4, including a secondary spring interposed longitudinally between the secondary spring piston and an end portion of the block housing, the secondary spring selectively resisting longitudinally directed compressive force therebetween, and the primary spring having a greater resistance to compression than does the secondary spring.

6. The tandem power transmission unit of claim 1, including a secondary spring interposed longitudinally between the secondary piston and an end portion of the block housing, the secondary spring selectively resisting longitudinally directed compressive force therebetween.

7. The tandem power transmission unit of claim 1, wherein the secondary chamber is at least partially defined by an end cap located on the block housing longitudinally opposite the electric motor.

8. The tandem power transmission unit of claim 7, wherein the end cap is retained on the block housing via at least two fastening structures.

9. The tandem power transmission unit of claim 1, wherein the electric motor includes a motor rotor operatively coupled to the ball screw and a motor stator mounted on the motor housing wherein motor torque developed by the motor stator is resisted by at least a portion of the motor housing.

10. The tandem power transmission unit of claim 9, including a bearing for rotatably supporting a supported end of the ball screw spaced apart from the primary chamber, wherein the motor rotor is interposed longitudinally between the ball nut and the bearing.

11. The tandem power transmission unit of claim 1, wherein at least one of the primary and secondary pistons includes a concave cup portion having an interior surface at least partially defined by a respective face of the piston, the concave cup portion at least partially defining a respective primary or secondary chamber.

12. The tandem power transmission unit of claim 11, wherein at least one of the primary and secondary pistons includes a cage structure carried by the face of the piston and extending from the face into a respective primary or secondary chamber, the cage structure and cup portion collectively defining an annular cavity therebetween, wherein the annular cavity is substantially coaxial with the respective primary or secondary chamber.

13. The tandem power transmission unit of claim 12, including at least one of a primary and secondary spring at least partially contained within the annular cavity, the at least one of a primary and secondary spring being operative to selectively resist longitudinally compressive force developed in the respective primary or secondary chamber.

14. The tandem power transmission unit of claim 11, wherein the primary piston includes the cage structure, the cage structure includes a central cage aperture at a cage end face spaced longitudinally apart from the face of the primary piston, the secondary piston carries a longitudinally extending pin protruding from the backside of the secondary piston, and the longitudinally extending pin penetrates slidingly through the central cage aperture for selectively limiting longitudinal travel of the secondary piston relative to the primary piston.

15. The tandem power transmission unit of claim 1, wherein the first and second output channels are arranged relative to the block housing such that rotation of the ball screw drives the primary and secondary pistons longitudinally to block the respective first and second output channels substantially simultaneously during operation of the tandem power transmission unit.

16. The tandem power transmission unit of claim 1, including an electronic control unit housing selectively connected to a portion of the block housing spaced longitudinally apart from the primary and secondary chambers, the electronic control unit housing enclosing an electronic control unit therein for operative connection to the electric motor.

17. The tandem power transmission unit of claim 16, including a bearing for rotatably supporting a supported end of the ball screw spaced apart from the primary chamber, wherein the motor housing includes a bearing retainer to maintain the bearing in relation to the motor housing, and wherein the bearing retainer is interposed longitudinally between the electronic control unit and the electric motor for preventing fluid communication therebetween.

18. The tandem power transmission unit of claim 1, wherein each of the primary and secondary chambers includes at least one annular sealing groove configured to contain an annular seal for resisting egress of hydraulic fluid from the respective primary or secondary chamber.

19. The tandem power transmission unit of claim 1, including a primary reservoir channel in fluid connection with the primary chamber and a secondary reservoir channel in fluid connection with the secondary chamber.

20. The tandem power transmission unit of claim 19, wherein each of the primary and secondary reservoir channels includes a replenishing check valve interposed hydraulically between a reservoir and a respective primary or secondary chamber.

21. The tandem power transmission unit of claim 20, wherein each replenishing check valve is maintained within a corresponding check valve cavity of the block housing, each check valve cavity being in fluid communication with a respective primary or secondary chamber.

22. The tandem power transmission unit of claim 20, wherein each replenishing check valve is operable to selectively route hydraulic fluid from the reservoir to a respective primary or secondary chamber when the electric motor is rotating the ball screw.

23. A brake system, comprising:
the tandem power transmission unit of claim 20;
a plurality of wheel brakes;
an iso/dump control valve arrangement associated with each wheel brake of the plurality of wheel brakes;
a first traction control iso valve hydraulically interposed between the tandem power transmission unit and at least one iso/dump control valve arrangement via the primary output line;
a second traction control iso valve hydraulically interposed between the tandem power transmission unit and at least one iso/dump control valve arrangement via the secondary output line;
at least two pump pistons, each associated with at least one wheel brake of the plurality of wheel brakes, the pump pistons being driven by a second electric motor for selectively providing pressurized hydraulic fluid to the iso/dump control valve arrangement of the at least one associated wheel brake;
a reservoir hydraulically connected to the tandem power transmission unit and each of the iso/dump control valve arrangements;
a first electronic control unit operative to control the electric motor of the tandem power transmission unit, at least one of the iso/dump control valve arrangements, and at least one of the first and second traction control iso valves under a first braking mode; and a second electronic control unit operative to control the second electric motor, at least one of the iso/dump control valve arrangements, and at least one of the first and second traction control iso valves under a second braking mode.

24. The brake system of claim 23, including an unloading valve interposed hydraulically between the at least two pump pistons and at least one associated wheel brake, the unloading valve being operatively hydraulically connected to the at least two pump pistons for selectively operating at least one of the pump pistons in a bypass mode.

25. A brake system, comprising:
the tandem power transmission unit of claim 20;
a plurality of wheel brakes;
an iso/dump control valve arrangement associated with each wheel brake of the plurality of wheel brakes;
a first traction control iso valve hydraulically interposed between the tandem power transmission unit and at least one iso/dump control valve arrangement via a primary output line;
a first auxiliary traction control iso valve hydraulically interposed between the tandem power transmission unit and first traction control valve via the primary output line;
a second traction control iso valve hydraulically interposed between the tandem power transmission unit and at least one iso/dump control valve arrangement via a secondary output line;
a second auxiliary traction control iso valve hydraulically interposed between the tandem power transmission unit and the second traction control iso valve via the secondary output line;
at least two pump pistons associated with at least one wheel brake of the plurality of wheel brakes, the pump pistons being driven by a second electric motor for selectively providing pressurized hydraulic fluid to the iso/dump control valve arrangement of the at least one associated wheel brake;
a reservoir hydraulically connected to the tandem power transmission unit and each of the iso/dump control valve arrangements;
a first electronic control unit operative to control the electric motor of the tandem power transmission unit and at least one of the traction control iso valves under a first braking mode;
a second electronic control unit operative to control the second electric motor, the iso/dump control valve arrangements, and at least one of the traction control iso valves under a second braking mode; and
an unloading valve interposed hydraulically between the at least two pump pistons and at least one associated wheel brake, the unloading valve being operatively hydraulically connected to the at least two pump pistons for selectively operating at least one of the pump pistons in a bypass mode.

26. A brake system, comprising:
the tandem power transmission unit of claim 20;
a plurality of wheel brakes;
an iso/dump control valve arrangement associated with each wheel brake of the plurality of wheel brakes;
a first traction control iso valve hydraulically interposed between the tandem power transmission unit and at least one iso/dump control valve arrangement via a primary output line;

a second traction control iso valve hydraulically interposed between the tandem power transmission unit and at least one iso/dump control valve arrangement via a secondary output line;

a pump piston associated with at least one wheel brake of the plurality of wheel brakes, the pump piston being driven by a second electric motor for selectively providing pressurized hydraulic fluid to the iso/dump control valve arrangement of the at least one associated wheel brake;

a reservoir hydraulically connected to the tandem power transmission unit and each of the iso/dump control valve arrangements;

a first electronic control unit operative to control the electric motor of the tandem power transmission unit, at least one of the iso/dump control valve arrangements, and at least one of the first and second traction control iso valves under a first braking mode;

a second electronic control unit operative to control the second electric motor, at least one of the iso/dump control valve arrangements, and at least one of the first and second traction control iso valves under a second braking mode.

27. A brake system, comprising:

the tandem power transmission unit of claim 20, wherein the electric motor is a first electric motor, having a first winding, for operation of the tandem power transmission unit in a first braking mode, and the tandem power transmission unit includes at least one of a second electric motor and a second winding on the first electric motor for selectively driving the ball screw to responsively reciprocate at least one of the primary and secondary pistons within a corresponding primary or secondary chamber in a second braking mode;

a plurality of wheel brakes;

an iso/dump control valve arrangement associated with each wheel brake of the plurality of wheel brakes;

a first traction control iso valve hydraulically interposed between the tandem power transmission unit and at least one iso/dump control valve arrangement via a primary output line;

a second traction control iso valve hydraulically interposed between the tandem power transmission unit and at least one iso/dump control valve arrangement via a secondary output line;

a reservoir hydraulically connected to the tandem power transmission unit and each of the iso/dump control valve arrangements;

a first electronic control unit operative to control the first electric motor of the tandem power transmission unit, at least one of the iso/dump control valve arrangements, and at least one of the first and second traction control iso valves under the first braking mode;

a second electronic control unit operative to control the at least one of the second electric motor and the second winding of the tandem power transmission unit, at least one of the iso/dump control valve arrangements, and at least one of the first and second traction control iso valves under the second braking mode.

28. A brake system, comprising:

the tandem power transmission unit of claim 1;

a plurality of wheel brakes;

an iso/dump control valve arrangement associated with each wheel brake of the plurality of wheel brakes;

a first traction control iso valve hydraulically interposed between the tandem power transmission unit and at least one iso/dump control valve arrangement via the primary output line;

a second traction control iso valve hydraulically interposed between the tandem power transmission unit and at least one iso/dump control valve arrangement via the secondary output line;

a pump piston associated with at least one wheel brake of the plurality of wheel brakes, the pump piston being driven by a second electric motor for selectively providing pressurized hydraulic fluid to the iso/dump control valve arrangement of the at least one associated wheel brake;

a reservoir hydraulically connected to the tandem power transmission unit and each of the iso/dump control valve arrangements;

a first electronic control unit operative to control the electric motor of the tandem power transmission unit; and a second electronic control unit operative to control the second electric motor, at least one of the iso/dump control valve arrangements, and at least one of the first and second traction control iso valves.

29. The brake system of claim 28, including a single return line placing the reservoir and each pump piston in direct hydraulic connection, wherein the reservoir includes first and second reservoir fluid sensors in electronic communication with respective first and second electronic control units.

* * * * *